(12) United States Patent
Lee et al.

(10) Patent No.: US 7,689,169 B2
(45) Date of Patent: Mar. 30, 2010

(54) BLUETOOTH DEVICE AND METHOD FOR PROVIDING SERVICE DETERMINED ACCORDING TO BLUETOOTH PIN

(75) Inventors: Jae-shin Lee, Seoul (KR); Joo-yeol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

(21) Appl. No.: 11/300,302

(22) Filed: Dec. 15, 2005

(65) Prior Publication Data

US 2006/0135065 A1 Jun. 22, 2006

(30) Foreign Application Priority Data

Dec. 17, 2004 (KR) ............... 10-2004-0107971

(51) Int. Cl.
*H04B 7/00* (2006.01)
(52) U.S. Cl. ............... 455/41.2; 713/171; 713/150; 713/156; 709/227; 709/228; 725/25; 380/277; 380/270
(58) Field of Classification Search ............. 455/41.2; 713/171, 150, 156; 709/227, 228; 725/25; 380/277, 270
See application file for complete search history.

(56) References Cited

U.S. PATENT DOCUMENTS

| 7,216,231 | B2 * | 5/2007 | Gehrmann | 713/171 |
| 7,249,182 | B1 * | 7/2007 | Heinonen et al. | 709/227 |
| 2003/0061606 | A1 * | 3/2003 | Hartwig et al. | 725/25 |
| 2004/0128509 | A1 | 7/2004 | Gehrmann | |

FOREIGN PATENT DOCUMENTS

| JP | 2001-285956 A | 10/2001 |
| JP | 2002-076977 A | 3/2002 |
| JP | 2003-196240 A | 7/2003 |
| JP | 2004-130693 A | 4/2004 |
| JP | 2004-178409 A | 6/2004 |
| JP | 2004-297711 A | 10/2004 |
| WO | WO 00/76120 A2 | 12/2000 |
| WO | WO 03/073304 A1 | 9/2003 |
| WO | 2004/025921 A2 | 3/2004 |

OTHER PUBLICATIONS

"Specification of the Bluetooth System" Profiles Version 1.0 B, Dec. 1999, pp. 4 and 33-36.
"Specification of the Bluetooth System, Specification vol. 1, Wireless Connections made easy, Core, V1.0 B, pp. 1, 47-66, 143-178, chapters 4. Packets, 13. Bluetooth Addressing, 14. Bluetooth Security" Specification of the Bluetooth System, Dec. 1, 1999, p. Complete57, XP002211422.

(Continued)

*Primary Examiner*—Matthew D Anderson
*Assistant Examiner*—April G Gonzales
(74) *Attorney, Agent, or Firm*—Sughrue Mion, PLLC (57) ABSTRACT

Disclosed herein are a Bluetooth device and method for providing a service determined according to Bluetooth PIN. The Bluetooth device includes a storage unit, a reception unit, a control unit, a key generation unit and a transmission unit. The storage unit stores the types of services and security policies according to Bluetooth PIN. The reception unit receives a link key. The control unit searches for a Bluetooth PIN corresponding to the received link key. The key generation unit creates a security key in accordance with the search results and stored security policies. The transmission unit transmits data associated with a service using the created security key.

14 Claims, 5 Drawing Sheets

OTHER PUBLICATIONS

Hager C T et al: "An analysis of bluetooth security vulnerabilities" Wireless Communications and Networking, 2003. WCNC 2003. 2003 IEEE Mar. 12-16, 2003, Piscataway, NJ, USA, IEEE, vol. 3, Mar. 16, 2003, pp. 1825-1831, XP010640047.

Ma Kui et al: "Research of bluetooth security manager" Neural Networks and Signal Processing, 2003. Proceedings of the 2003 International Conference on Nanjing, China Dec. 14-17, 2003, Piscataway, NJ, USA, IEEE, vol. 2, Dec. 14, 2003, pp. 1681-1684, XP010691846.

* cited by examiner

| Bluetooth PIN | trustworthiness | service | security policy | security application mode |
|---|---|---|---|---|
| 1234 | trustworthy | headset | authentication authorization | mandatory mandatory |
| | | PAN | authentication encryption | optional conditional |
| 2345 | untrustworthy | LAN | X | X |
| | | PAN | authentication authorization encryption SSL | optional conditional |

BLUETOOTH DEVICE AND METHOD FOR PROVIDING SERVICE DETERMINED ACCORDING TO BLUETOOTH PIN

CROSS-REFERENCE TO RELATED APPLICATION

This application claims priority from Korean Patent Application No. 10-2004-0107971 filed on Dec. 17, 2004 in the Korean Intellectual Property Office, the disclosure of which is incorporated herein in its entirety by reference.

BACKGROUND OF THE INVENTION

1. Field of the Invention

The present invention relates generally to a Bluetooth device and method for providing a service determined according to a Bluetooth personal identification number and, more particularly, to a Bluetooth device and method for providing a service determined according to a Bluetooth personal identification number, in which a first Bluetooth device, which stores one or more Bluetooth PINs matched to services having different security policies, ascertains the Bluetooth personal identification number of a second Bluetooth device, which wants to receive a service from the first Bluetooth device, and provides the service according to a security policy corresponding to the Bluetooth personal identification number.

2. Description of the Related Art

Bluetooth wireless technology provides peer-to-peer communication between Bluetooth devices within a local area. In Bluetooth, security measures are provided in the application layer and the link layer to offer secure communication. The security measures are performed by a security manager.

In the link layer, it is determined whether to grant a peer Bluetooth device access, and in the application layer, it is determined whether to provide a service to a peer Bluetooth device.

The service-providing Bluetooth device creates a link key using the address of the Bluetooth device, a Bluetooth Personal Identification Number (PIN) and a random number (RAND). At this time, the address of a Bluetooth device that wants to receive the service is used as the address of the Bluetooth device, and a random number that is created by the service-providing Bluetooth device is used as the RAND.

The Bluetooth PIN is a value that is input by a user, and this PIN must be input to both Bluetooth devices to create a link key.

The RAND is a variable value that is created whenever a connection is established between Bluetooth devices.

The link key is created in a specific communication session that is called "pairing." The link key created as described above is used to create a new link key through a link key exchange. The newly created link key that is shared by Bluetooth devices that want to communicate is used in a procedure of authenticating a peer Bluetooth device. During the authentication procedure, an encryption key is created based on the shared link key. Thereafter, all data that is received and transmitted is respectively decrypted and encrypted using the encryption key.

Bluetooth security modes are classified into the following three types according to policy.

A security mode 1 is a non-secure mode where the Bluetooth device does not perform any security procedures.

A security mode 2 is a service-level security mode, which provides different security policies for individual services. In this mode different security policies may be provided for individual services. The Bluetooth device performs security procedures after a link level function is completed.

A security mode 3 is a link-level security mode, which applies the same security policy to all the connections. The Bluetooth device performs the procedures of this mode at a link level.

Furthermore, the Bluetooth device may set different security levels according to the type of service that is provided by the Bluetooth device, or a peer Bluetooth device.

In that case, peer Bluetooth devices are classified into trusted devices that can permanently and freely access all the services, and untrusted devices that are temporarily granted access to services or are not granted access to the services.

Authentication, authorization and encryption are independently applied security services. Security services are classified into the following three classes.

A first class requires authentication and authorization; it grants only trusted devices access at the time of automatic connection and it makes other devices undergo a manual authorization procedure.

A second class requires authentication and does not require authorization.

A third class does not require authentication or authorization; it grants all Bluetooth devices access.

Authentication is a procedure of identifying a Bluetooth device that wants to receive a service, which is performed using a stored link key or a Bluetooth PIN.

Authorization is a procedure of determining whether a specific Bluetooth device, which wants to receive a specific service, has an access right to the specific service, which is only granted to authenticated Bluetooth devices. Authorization may be done manually by a user.

Figure 1:
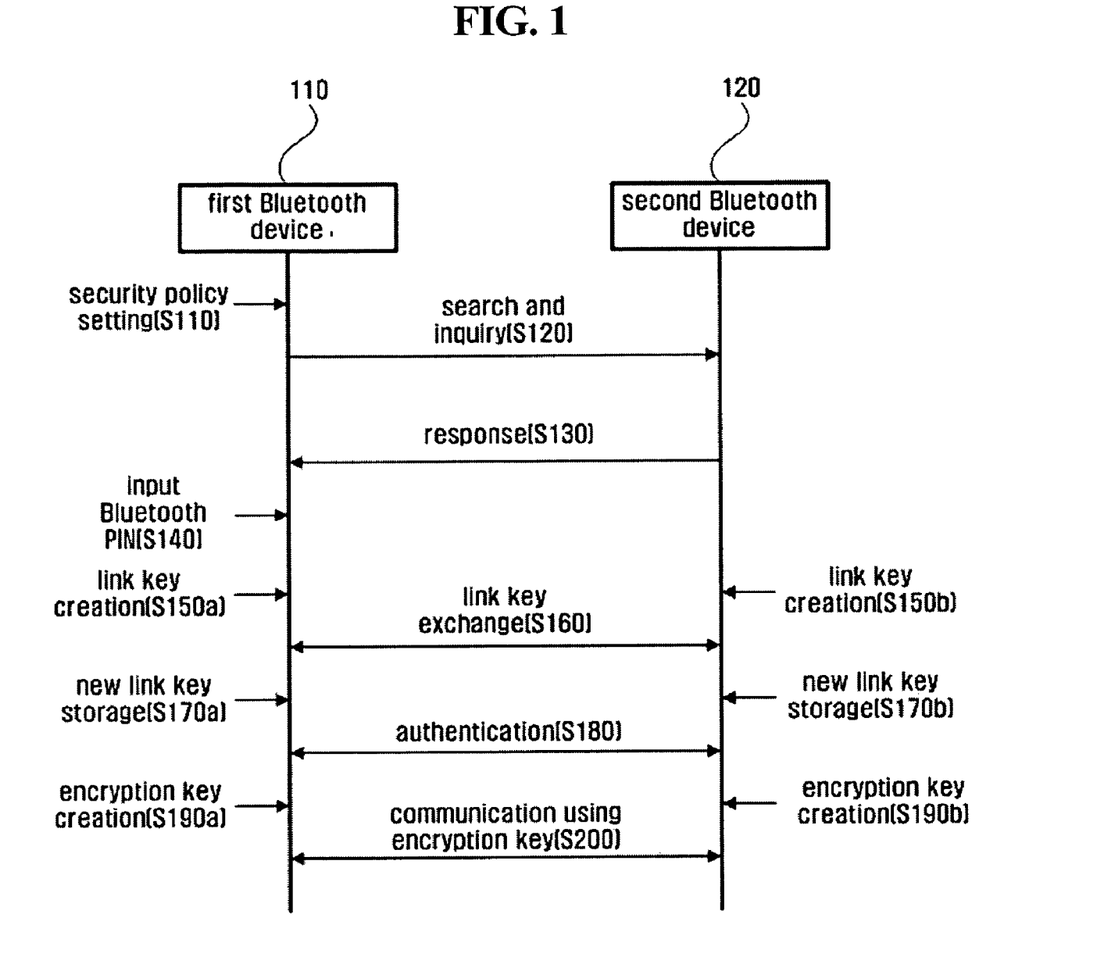
FIG. 1 is a diagram showing the conventional process of constructing a secure network between Bluetooth devices.

FIG. 1 is a diagram showing the conventional process of constructing a security network between Bluetooth devices.

A user sets service security policies for a first Bluetooth device 110 that provides services, and stores the service security policy in step S110. For example, when the first Bluetooth device 110 supports headset and Personal Area Network (PAN) services, the user applies authentication and encryption policies to a second Bluetooth device 120 that wants to receive a headset service, and applies authentication and Secure Socket Layer (SSL) to another second Bluetooth device 120 that wants to receive a PAN service.

The user may set security policies for individual services, and set the types of services for individual second Bluetooth devices.

The user sets the second Bluetooth device 120 to a pairing mode, and causes the first Bluetooth device 110 to search for the second Bluetooth device 120. Accordingly, the first Bluetooth device 110 inquires about a Bluetooth connection with the second Bluetooth device 120 in step S120, and receives a response from the second Bluetooth device 120 in step S130.

The second Bluetooth device 120 requests authentication from the first Bluetooth device 110. If the preset link key of the second Bluetooth device 120 does not exist in the first Bluetooth device 110, the user is requested to input the Bluetooth PIN of the second Bluetooth device 120 in step S140.

If the Bluetooth PIN is input by the user, a link key is created between the Bluetooth devices in steps S150a and 150b and the newly created link key is shared through a link key exchange S160. The newly created link key is stored in non-volatile memory by the first and second Bluetooth devices 110 and 120 in steps S170a and S170b.

Using the link key stored in memory, the second Bluetooth device 120 authenticates the first Bluetooth device 110, and the first Bluetooth device 110 authenticates the second Bluetooth device 120 in step S180. The first and second Bluetooth devices 110 and 120 selectively exchange an encryption key according to the security policies. All the data exchanged thereafter is encrypted by the encryption key created through the encryption key exchange (steps S190a and S190b) in step S200.

When a new second Bluetooth device 120 wants to use the services of the first Bluetooth device 110, and a link key associated with the new second Bluetooth device 120 is not stored, the user must input the Bluetooth PIN to the first Bluetooth device 110 and the new second Bluetooth device 120 in the pairing step. When the first Bluetooth device 110 supports a plurality of services, service access permissions must be set.

SUMMARY OF THE INVENTION

Accordingly, the present invention has been made keeping in mind the above problems occurring in the prior art, and an aspect of the present invention is to create a link key using a preset Bluetooth PIN when a previously stored link key does not exist between a first Bluetooth device, which stores one or more Bluetooth PINs matched to services having different security policies, and a second Bluetooth device, which wants to receive a service from the first Bluetooth device.

Another aspect of the present invention is to selectively provide services to second Bluetooth devices, which want to receive the services, according to the Bluetooth PIN of the second Bluetooth devices by setting the types of services according to Bluetooth PIN in the first Bluetooth device.

In order to accomplish the above aspect, the present invention provides a Bluetooth device for providing a service determined according to Bluetooth PIN, including a storage unit for storing the types of services and security policies according to Bluetooth PIN; a reception unit for receiving a link key; a control unit for searching for a Bluetooth PIN corresponding to the received link key; a key generation unit for creating a security key in conformity with search results and the stored security policies; and a transmission unit for transmitting data associated with a service using the created security key.

In addition, the present invention provides a Bluetooth method of providing a service determined according to Bluetooth PIN, including the steps of storing the types of services and security policies according to Bluetooth PIN; receiving a link key; searching for a Bluetooth PIN corresponding to the received link key; creating a security key in conformity with search results and the stored security policies; and transmitting data associated with a service using the created security key.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF EXEMPLARY EMBODIMENTS

Reference should now be made to the drawings, in which the same reference numerals are used throughout the different drawings to designate the same or similar components.

The terms used in the present specification and the attached claims are defined first.

The term "Bluetooth PIN" refers to a number that is used to authenticate different Bluetooth devices in order to establish a trusted connection between the Bluetooth devices. The Bluetooth PIN is used to create a link key in a pairing step.

The Bluetooth PIN may be directly input by a user when a Bluetooth device is equipped with a user interface, or it may be input through another Bluetooth device.

The term "pairing" is defined in the Link Manager Protocol, and refers to the step of creating a link key that is used to authenticate two Bluetooth devices and support a trusted connection.

Since the link key is created with reference to the Bluetooth PIN in the pairing step, the user must input the Bluetooth PIN if there is no stored link key.

The term "authentication" refers to the step of checking the security associated with a peer Bluetooth device, and is based on a challenge-response scheme. When an authenticating Bluetooth device transmits a random number to the peer Bluetooth device, the peer Bluetooth device creates a response code using the received random number, its address and a secret key and transmits the response code to the authenticating Bluetooth device.

The authenticating Bluetooth device checks the security associated with the peer Bluetooth device by examining the received response code.

At this time, the secret key is shared by both Bluetooth devices and is referred to as a "link key."

The term "authorization" refers to the step of determining whether to provide a service at the request of a peer Bluetooth device, which is performed only on Bluetooth devices that have undergone the authentication step.

The authorization may be manually determined by the user's command, or it may be automatically determined according to a peer Bluetooth device list.

The term "encryption" refers to the step of encrypting to-be-exchanged data using a predetermined algorithm. In this case, the address and encryption key of the Bluetooth device are applied to the algorithm, and the encryption key is created with reference to a shared link key.

Exemplary embodiments of the present invention are described in detail with reference to the accompanying drawings in the following.

Figure 2:
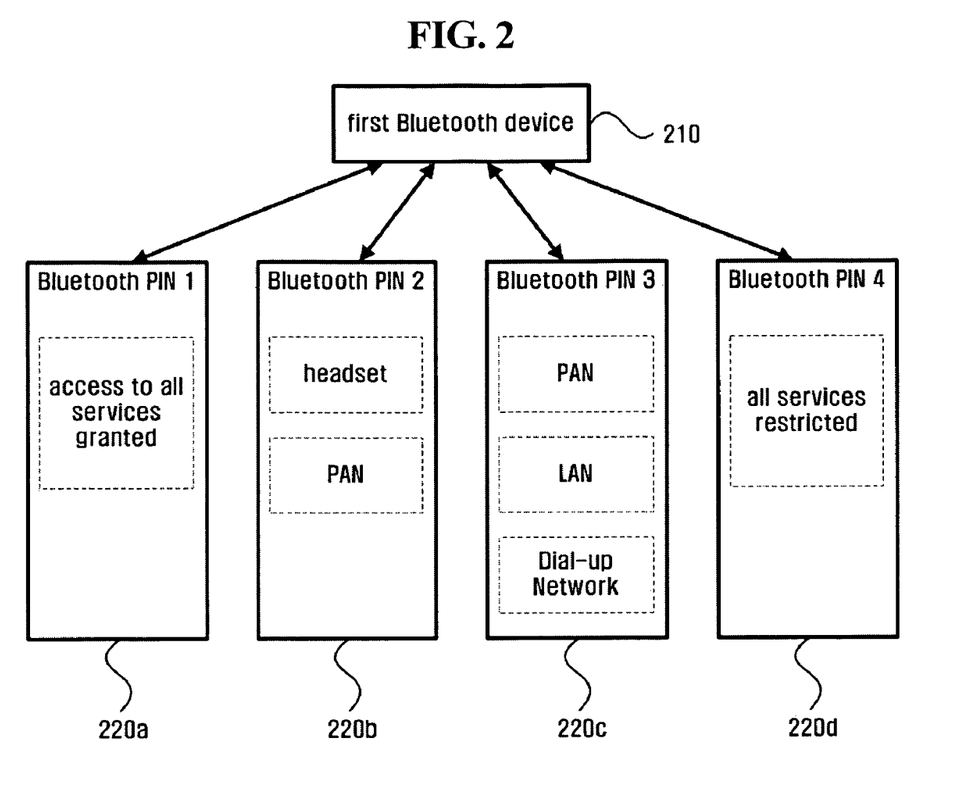
FIG. 2 is a diagram showing Bluetooth devices that are grouped according to their Bluetooth PIN and that receive services according to an embodiment of the present invention.

FIG. 2 is a diagram according to an embodiment of the present invention that shows Bluetooth devices that are grouped according to Bluetooth PIN and that receive services.

A Bluetooth device 210 that provides services (hereinafter referred to as a "first Bluetooth device") and Bluetooth devices 220a, 220b, 220c and 220d that receive the services (hereinafter referred to as "second Bluetooth devices") store Bluetooth PINs.

The Bluetooth PINs are random numbers that are used to check the security associated with peer Bluetooth devices, and they are input when the Bluetooth devices are manufactured, but they can be changed by users. As a result, different Bluetooth devices may have the same Bluetooth PIN.

As illustrated in FIG. 2, Bluetooth devices having the same Bluetooth PINs are grouped into several Bluetooth device groups 220a, 220b, 220c and 220d, and are managed by the first Bluetooth device 210. The second Bluetooth device groups 220a, 220b, 220c and 220d can access different services.

For example, the second Bluetooth device group having a Bluetooth PIN 2 may receive headset and PAN services from the first Bluetooth device, and the second Bluetooth device group having a Bluetooth PIN 3 may receive PAN, Local Area Network (LAN) and dial-up network services.

The first Bluetooth device 210 may provide services to the second Bluetooth device groups 220a, 220b, 220c and 220d according to preset security policies.

The security policies of authentication, authorization, encryption and SSL may be independently set to: 'mandatory', 'optional', 'conditional' or 'determined-by-user'.

In other words, the security policies of authentication and encryption are respectively set to the mandatory mode and the conditional mode.

In regard to the authorization that is performed in the application layer of the first Bluetooth device 210 and that determines whether to provide a corresponding service, the trustworthiness of the second Bluetooth device groups 220a, 220b, 220c and 220d is determined, and the authorization is set to the 'mandatory', 'optional', 'conditional' or 'determined-by-user' mode.

For example, a trusted second Bluetooth device group can receive a service without any limitations, an untrusted second Bluetooth device group is prohibited from receiving a service when the mandatory mode is applied, another untrusted second Bluetooth device group receives a service in accordance with an option or a condition when an optional or a conditional mode is applied (for example, as in the case where access to the service is denied if another second Bluetooth device group is using a service, and the service is provided if not), and another untrusted second Bluetooth device group receives a service according to a user's command when a determined-by-user mode is applied.

The first Bluetooth device 210 may grant a second Bluetooth device group having a specific Bluetooth PIN access to all of the services, or it may deny a second Bluetooth device group having another Bluetooth PIN access to all of the services. This scheme may be applied to security policies, such as authentication and authorization.

It is preferable, but not necessary, that the first Bluetooth device 210 store the types of services and security policies according to Bluetooth PIN in the form of a table and that the table be frequently changed by the user according to the situation.

Figure 3:
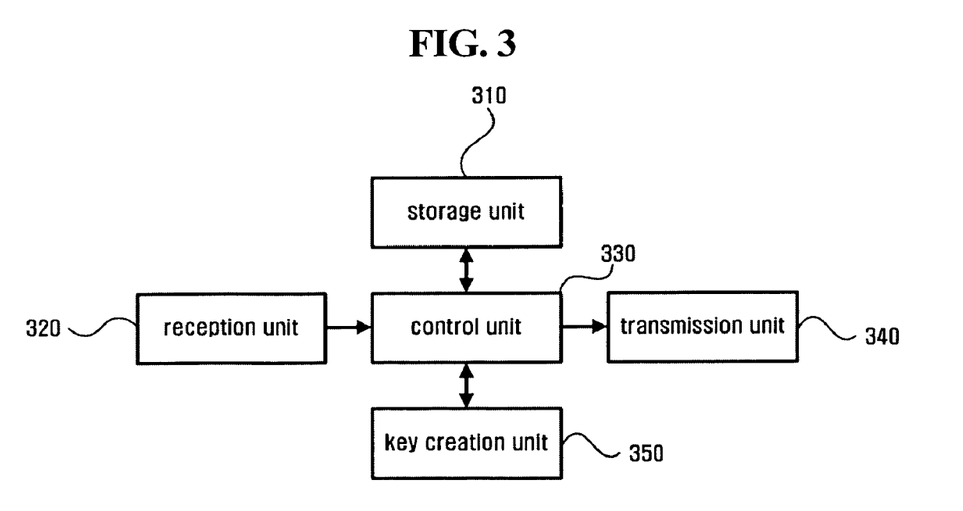
FIG. 3 is a block diagram showing a Bluetooth device that provides a service determined according to a Bluetooth PIN in accordance with an embodiment of the present invention.

FIG. 3 is a block diagram showing a Bluetooth device that provides a service determined according to a Bluetooth PIN in accordance with an embodiment of the present invention.

The Bluetooth device (first Bluetooth device) 210 that provides a service determined according to a Bluetooth PIN includes a storage unit 310, a reception unit 320, a control unit 330, a key creation unit 350, and a transmission unit 340.

The storage unit 310 stores the types of services and security policies according to Bluetooth PIN.

As described above, in the present invention, the Bluetooth PIN is used to provide the same service to all of the members of a Bluetooth device group having the same Bluetooth PIN according to a single security policy.

It is preferable, but not necessary, that a Bluetooth PIN be set for the second Bluetooth device that wants to receive a service from the first Bluetooth device 210. The Bluetooth PIN may be input by the user, or at the time of manufacture of the second Bluetooth device.

Figure 4:
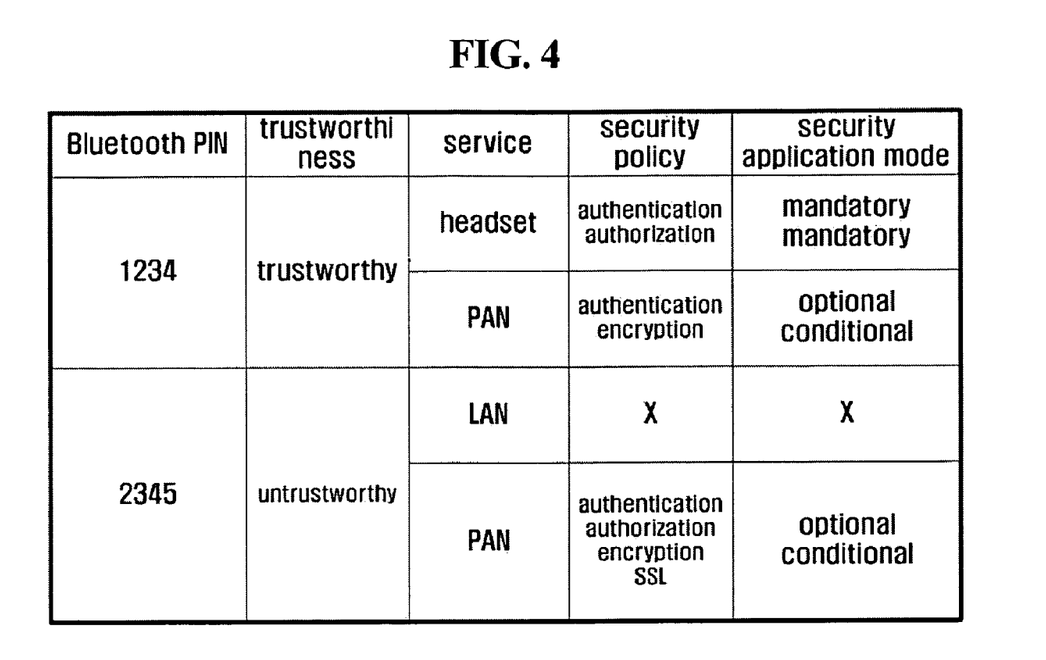
FIG. 4 is a table showing the types of services and security policies according to Bluetooth PIN in accordance with an embodiment of the present invention.

It is preferable, but not necessary, that the types of services and security policies according to Bluetooth PIN be stored in the form of a table as shown in FIG. 4.

In the table, the types of services and security polices according to Bluetooth PIN are specified.

Referring to FIG. 4, a second Bluetooth device that has a Bluetooth PIN of 1234 and wants to receive a headset service from the first Bluetooth device 210 can receive a headset service for which the security policies of authentication and authorization are in a mandatory mode, while a second Bluetooth device that has a Bluetooth PIN of 2345 and wants to receive a LAN service from the first Bluetooth device 210 may receive the LAN service to which no security policy or mode is set.

The reception unit 320 receives a link key from the second Bluetooth device.

The user sets a pairing mode for the second Bluetooth device that wants to receive a service from the first Bluetooth device 210 and sets a search mode for the first Bluetooth device 210. At this time, the second Bluetooth device receives a search message from the first Bluetooth device 210 and then transmits its link key to the first Bluetooth device 210.

The link key transmitted from the second Bluetooth device is created using the Bluetooth address and Bluetooth PIN of the second Bluetooth device and a RAND received from the first Bluetooth device 210. It is preferable, but not necessary, that the second Bluetooth device receive the RAND from the first Bluetooth device 210 at the time of searching for the first Bluetooth device 210.

The reception unit 320 having received the link key from the second Bluetooth device transfers the received link key to the control unit 330.

The control unit 330 searches for a Bluetooth PIN corresponding to the link key that has been received from the reception unit 320, with reference to the Bluetooth PIN table stored in the storage unit 310.

At this time, the control unit 330 creates a link key through the key creation unit 350 using the RAND transmitted to the second Bluetooth device, the Bluetooth PIN stored in the storage unit 310, and the address of the second Bluetooth device, and searches for the corresponding Bluetooth PIN by comparing the created link key with the link key received from the second Bluetooth device. It is preferable, but not necessary, that the address of the second Bluetooth device be received in advance.

The control unit 330 compares the link key created by the key creation unit 350 with the link key of the second Bluetooth device received from the reception unit 320, prevents the key creation unit 350 from generating another link key if the link keys are coincident, finds a Bluetooth PIN corresponding to the coincident link key, and provides a service based on the security policy corresponding to the Bluetooth PIN.

The key creation unit 350 creates a link key and an encryption key.

The key creation unit 350 creates a link key with reference to a Bluetooth PIN stored in the storage unit 310 in response to a command from the control unit 330 in a pairing step.

The transmission unit 340 provides a service to the second Bluetooth device based on the security policy and according to a command from the control unit 330.

For example, when the second Bluetooth device requests a service and the security policies set for the corresponding Bluetooth PIN are authentication and authorization, an authentication step is performed using a link key created by the key creation unit 350, the trustworthiness of the second Bluetooth device is assessed, and a service is provided or not provided according to the assessment.

Figure 5:
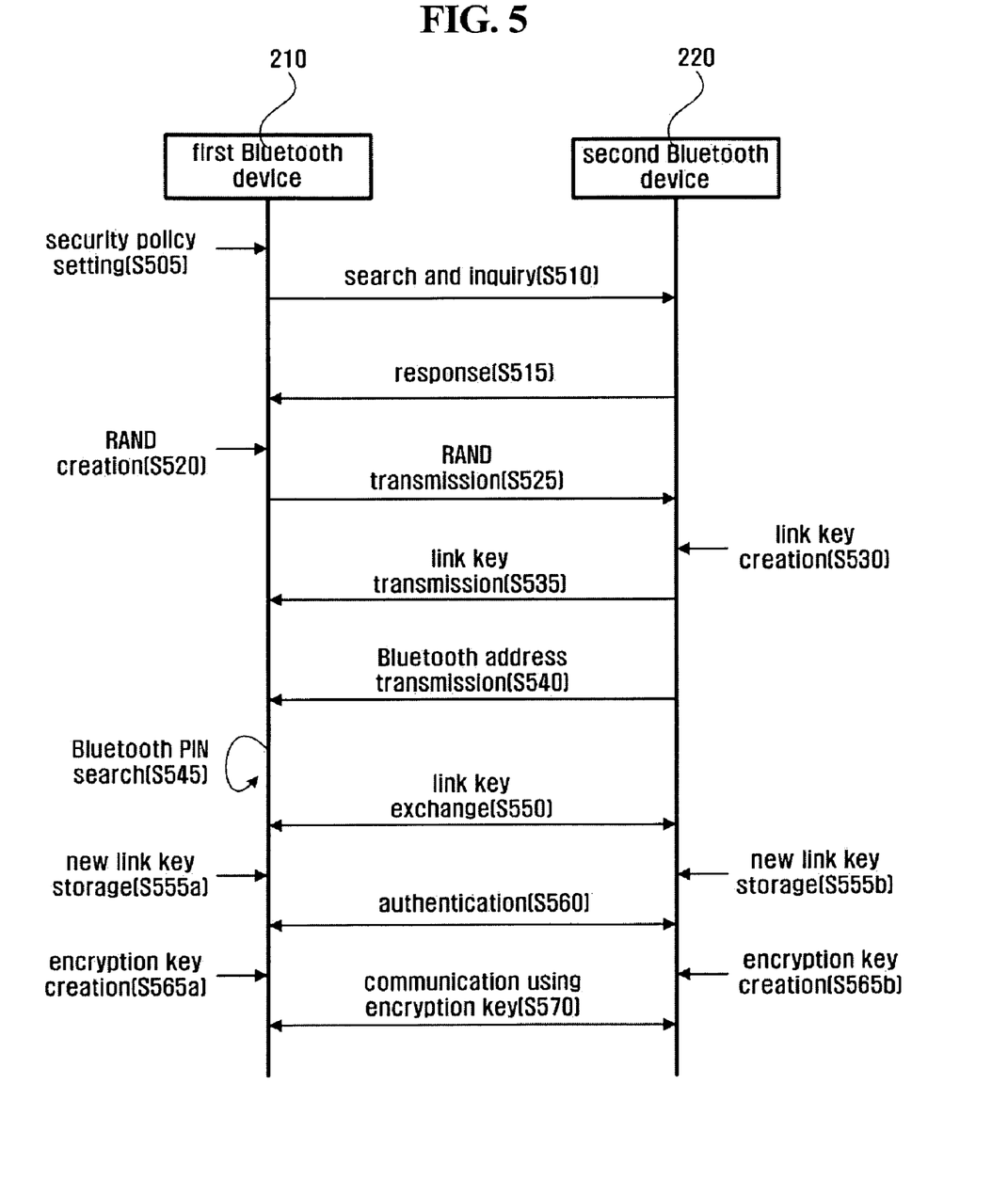
FIG. 5 is a diagram showing a process of constructing a secure network between Bluetooth devices in accordance with an embodiment of the present invention.

FIG. 5 is a diagram showing a process of constructing a secure network between Bluetooth devices in accordance with an embodiment of the present invention.

A user sets the types of services and security policies according to Bluetooth PIN for the first Bluetooth device 210 and stores them in the first Bluetooth device 210 in step S505. The Bluetooth PIN may be directly input by the user, or it may be automatically created and input.

When there is a second Bluetooth device 220 that wants to receive a service from the first Bluetooth device 210, the user sets the first Bluetooth device 210 to a search mode and sets the second Bluetooth device 220 to a pairing mode, thus allowing the first Bluetooth device to search for the second Bluetooth device 220. Accordingly, the first Bluetooth device 210 inquires about a Bluetooth connection with the second Bluetooth device 220 in step S510, and receives a response from the second Bluetooth device 220 in step S515.

The first Bluetooth device 210, having received a response from the second Bluetooth device 220, creates a RAND in step S520, and transmits the RAND to the second Bluetooth device 220 in step S525.

The second Bluetooth device 220, having received the RAND from the first Bluetooth device 210, creates a link key using the received RAND, its Bluetooth address and a Bluetooth PIN in step S530, and transmits the link key to the first Bluetooth device 210 in step S535. It is preferable, but not necessary, that the second Bluetooth device 220 transmits its Bluetooth address so that the first Bluetooth device 210 can create a link key associated with the second Bluetooth device 220 in step S540.

The first Bluetooth device 210, having received the link key and the Bluetooth address from the second Bluetooth device 220, searches a Bluetooth PIN table, which is stored therein, for a corresponding Bluetooth PIN in step S545.

The search for the Bluetooth PIN by the first Bluetooth device 210 is performed by comparing the link key, which is created using the RAND transmitted to the second Bluetooth device 220, the address of the second Bluetooth device 220 received from the second Bluetooth device 220 and the Bluetooth PIN in the Bluetooth PIN table, with the link key received from the second Bluetooth device 220 in step S550.

The first Bluetooth device 210, having found a coincident link key during the search, stops the search for the Bluetooth PIN, and exchanges link keys with the second Bluetooth device 220 in step S550.

The first Bluetooth device 210 and the second Bluetooth device 220 store the new link key that is created through the link key exchange (step S550) in steps S555a and S555b.

The stored new link key may be used in the authentication step S560 according to the security policies, and it may be used in the encryption key creation steps S565a and S565b, so that the Bluetooth device 210 can transmit encrypted data to the second Bluetooth device 220 in step S570.

Figure 6:
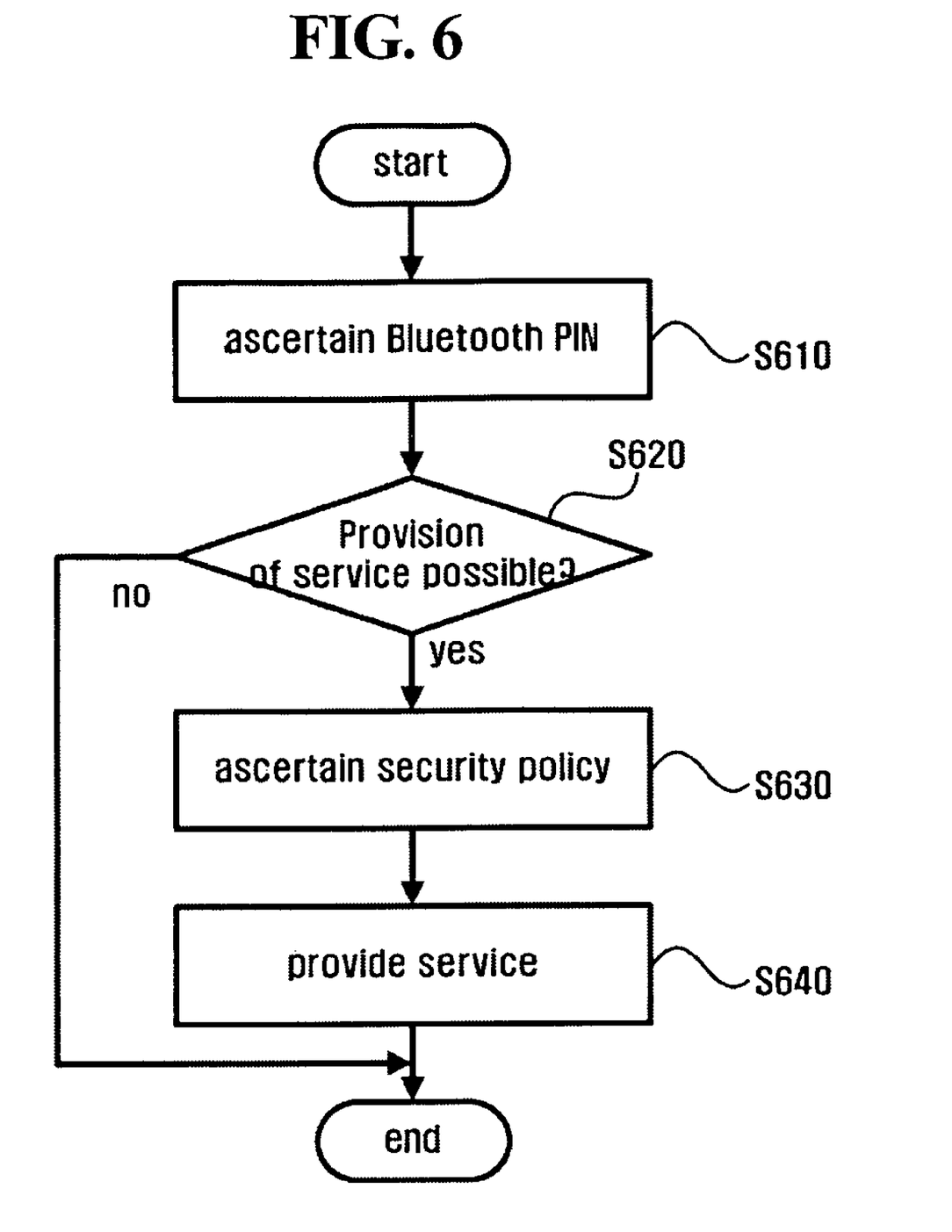
FIG. 6 is a flowchart showing a process of providing a service determined according to a Bluetooth PIN in accordance with an embodiment of the present invention.

FIG. 6 is a flowchart showing a process of providing a service determined according to Bluetooth PIN in accordance with an embodiment of the present invention.

The first Bluetooth device ascertains a corresponding Bluetooth PIN from the Bluetooth PIN table after the link key exchange with the second Bluetooth device in step S610. The first Bluetooth device determines whether the service requested by the second Bluetooth device can be provided to the second Bluetooth device group having the Bluetooth PIN in step S620. If the service can be provided, the security policy associated with the service is ascertained in step S630.

A mandatory, optional, conditional, or determined-by-user mode can be applied to the authentication, authorization, encryption and SSL security policies. At step S640, a service is provided to the second Blue device according to the security policy.

For example, when authentication and authorization are set for the security policies and a mandatory mode is applied to the security policies, the first Bluetooth device performs authentication using the link key that is newly created through a key exchange with the second Bluetooth device and determines whether to grant access using the trustworthiness of the corresponding Bluetooth PIN group.

The present invention can achieve the following effects.

First, the present invention is advantageous in that when a common link key does not exist between a first Bluetooth device and a second Bluetooth device, a link key can be created using a preset Bluetooth PIN.

Second, the present invention is advantageous in that a first Bluetooth device can selectively provide services to second Bluetooth devices according to the Bluetooth PIN of the second Bluetooth devices by setting the types of services according to Bluetooth PIN in the first Bluetooth device.

The exemplary embodiments of the present invention have been disclosed for illustrative purposes, and those skilled in the art will appreciate that various modifications, additions and substitutions are possible, without departing from the scope and spirit of the invention as disclosed in the accompanying claims.

What is claimed is:

1. A Bluetooth device for providing a service determined according to a Bluetooth Personal Identification Number (PIN), comprising:
    a storage unit configured to store types of services and security policies according to Bluetooth PIN;
    a reception unit configured to receive a link key;
    a control unit configured to search for a Bluetooth PIN corresponding to the received link key;
    a key generation unit configured to create a security key in accordance with the search results and the stored security policies; and
    a transmission unit configured to transmit data associated with a service using the created security key.

2. The Bluetooth device as set forth in claim 1, wherein the stored Bluetooth PINs are numbers that are previously set and stored manually or automatically.

3. The Bluetooth device as set forth in claim 1, wherein each of the security policies is information about the use of at least one of authentication, authorization, encryption and Secure Socket Layer (SSL).

4. The Bluetooth device as set forth in claim 3, wherein the security policy is information that applies at least one of a mandatory mode, an optional mode, a conditional mode and a determined-by-user mode to at least one of authentication, authorization, encryption and SSL.

5. The Bluetooth device as set forth in claim 1, wherein the security key comprises:
    a link key created using the stored Bluetooth PINs; and
    an encryption key created using the created link key.

6. The Bluetooth device as set forth in claim 1, wherein the transmission unit allows a Bluetooth link manager to provide the service according to the search results through authentication or encryption.

7. The Bluetooth device as set forth in claim 1, wherein the Bluetooth device is configured to serve a plurality of devices,
   wherein each device of the plurality of devices contains a Bluetooth PIN,
   wherein each device of the plurality of devices is served according a type of service and security policy according to its Bluetooth PIN, and
   wherein the PIN of at least one device of the plurality of devices is identical to the PIN of another device of the plurality of devices.

8. A Bluetooth method of providing a service determined according to a Bluetooth pin, comprising:
   storing types of services and security policies according to Bluetooth PIN;
   receiving a link key;
   searching for a Bluetooth PIN corresponding to the received link key;
   creating a security key in accordance with the search results and the stored security policies; and
   transmitting data associated with the service using the created security key.

9. The Bluetooth method as set forth in claim 8, wherein the stored Bluetooth PINs are numbers that are previously set and stored manually or automatically.

10. The Bluetooth method as set forth in claim 8, wherein each of the security policies is information about the use of at least one of authentication, authorization, encryption and Secure Socket Layer (SSL).

11. The Bluetooth method as set forth in claim 10, wherein the security policies is information that applies at least one of a mandatory mode, an optional mode, a conditional mode and a determined-by-user mode to at least one of the authentication, authorization, encryption and SSL.

12. The Bluetooth method as set forth in claim 8, wherein the operation of creating the security key comprises:
   creating a link key using the stored Bluetooth PINs; and
   creating an encryption using the created link key.

13. The Bluetooth method as set forth in claim 8, wherein the operation of providing the service is performed by allowing a Bluetooth link manager to provide the service according to the search results through authentication or encryption.

14. The Bluetooth method as set forth in claim 13, wherein the operation of providing the service comprises:
   performing a link key exchange using the link key created according to the security policies;
   creating the encryption key using a new link key created through the link key exchange; and
   transmitting and receiving encrypted data using the encryption key.

* * * * *